US007286593B1

(12) United States Patent
Banerjee

(10) Patent No.: US 7,286,593 B1
(45) Date of Patent: Oct. 23, 2007

(54) SYSTEM AND METHOD FOR CHANNEL ESTIMATION IN A RADIO FREQUENCY RECEIVER

(75) Inventor: Debarag N. Banerjee, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 1101 days.

(21) Appl. No.: 10/195,234

(22) Filed: Jul. 15, 2002

(51) Int. Cl.
*H04B 1/00* (2006.01)
(52) U.S. Cl. .................. 375/148; 375/142; 375/152
(58) Field of Classification Search ............ 375/142, 375/143, 147, 148, 150, 152
See application file for complete search history.

(56) References Cited

U.S. PATENT DOCUMENTS

| 7,012,955 B2* | 3/2006 | Lee et al. ............ 375/224 |
| 7,058,399 B2* | 6/2006 | Klein et al. ........... 455/424 |
| 7,106,784 B2* | 9/2006 | Eltawil et al. .......... 375/148 |

OTHER PUBLICATIONS

Ji-Woong Choi and Yong-Hwan Lee, "An adaptive channel estimator in pilot channel based DS-CDMA systems", IEEE 55th Vehicular Technology Conference, 2002. VTC Spring 2002, vol. 3, May 6-9, 2002 pp. 1429-1433 vol. 3.*
Karam, "Digital filtering", chapter 11 of the book "Digital Signal Processing Handbook" edited by Douglas B. Williams and Vijay K. Madisetti, CRC press 1997 pp. 11-32 to 11-35.*
Ji-Woong Choi and Yong-Hwan Lee, "Adaptive channel estimation in DS-CDMA downlink systems", The 13th IEEE International Symposium on Personal, Indoor and Mobile Radio Communications, 2002. vol. 3, Sep. 15-18, 2002 pp. 1432-1436 vol. 3.*
Sakamoto, "Adaptive channel estimation with velocity estimator for W-CDMA receiver", IEEE 51st Vehicular Technology Conference Proceedings, 2000, VTC 2000-Spring Tokyo. 2000 vol. 3, May 15-18, 2000 pp. 2024-2028 vol. 3.*
Karam, "Digital filtering", chapter 11 of the book "Digital Signal Processing Handbook" edited by Douglas B. Williams and Vijay K. Madisetti, CRC press 1997 pp. 11-40 to 11-42.*
Mitra, "Handbook for digital signal processing", 1993 pp. 425-427.*
Choi, "Design of channel estimation filter in DS-CDMA uplink systems," IEEE ISPACS'00, pp. 1011-1016, Nov. 2000.*
Ji-Woong Choi et al., "Adaptive Channel Estimation in DS-CDMA Downlink Systems," 2002 IEEE, pp. 1432-1436.
Ji-Woong Choi et al., "An Adaptive Channel Estimator in Pilot Channel Based DS-CDMA Systems," 2002 IEEE, pp. 1429-1433.
Lina J. Karam et al., "Digital Filtering," The Digital Signal Processing Handbook, 1998 by CRC Press LLC, pp. 11-1-11-35.

\* cited by examiner

*Primary Examiner*—Temesghen Ghebretinsae
*Assistant Examiner*—Juan Alberto Torres

(57) ABSTRACT

A channel estimator for determining channel weighting coefficients for a finger of the RAKE receiver. The channel estimator comprises: 1) a first correlator for receiving a first pilot channel signal and correlating the first pilot channel signal with a first pilot channel chip pattern associated with the first pilot channel signal to produce an output comprising a first pilot channel symbol sequence; and 2) a first channel estimation filter capable of receiving the first pilot channel symbol sequence and generating first channel weighting coefficients. The first channel estimation filter minimizes the mean squared error of the channel estimate in the first channel weighting coefficients caused by additive noise and Doppler effects, wherein the mean squared error is minimized across a range of Doppler frequencies from 0 Hz up to a predetermined maximum Doppler frequency.

29 Claims, 5 Drawing Sheets

SYSTEM AND METHOD FOR CHANNEL ESTIMATION IN A RADIO FREQUENCY RECEIVER

TECHNICAL FIELD OF THE INVENTION

The present invention relates generally to wireless receivers and, more particularly, to an apparatus and a related method in a wireless receiver that performs channel estimation using minimum mean squared error (MMSE) across a range of Doppler frequencies.

BACKGROUND OF THE INVENTION

Business and consumers use a wide array of wireless devices, including cell phones, wireless local area network (LAN) cards, global positioning system (GPS) devices, electronic organizers equipped with wireless modems, and the like. The increased demand for wireless communication devices has created a corresponding demand for technical improvements to such devices. Generally speaking, wireless system designers attempt to minimize the cost of conventional radio receivers while improving the performance of such devices. Performance improvements include, among other things, lower power consumption, greater range, increased receiver sensitivity, lower bit error rates (BER), higher transmission rates, and the like.

Signal fading due to variations in channel characteristics is a major factor limiting the performance of modern mobile wireless communication systems. To compensate for signal fading, many modern code division multiple access (CDMA) networks use diversity techniques to transmit multiples copies of a signal over a channel to a mobile station. In the mobile station, a RAKE receiver uses multiple baseband correlators to individually process several signal multipath components. The correlator outputs are then combined to achieve improved performance.

However, a RAKE receiver assumes that the channel variations over time are relatively slow. This may not be the case if the mobile station is moving relatively quickly. Channel variations due to Doppler effects caused by the relative motion of the base station transmitter and the mobile station receiver often become significant. To correct this, receivers have been developed that use minimum mean squared error (MMSE) channel estimation filters that require knowledge of the specific Doppler frequency and the specific signal-to-interference ratio (SIR) level. Unfortunately, if the Doppler frequency or the SIR level changes, the filter also changes. Thus, the RAKE receiver requires a Doppler estimator and each finger of the RAKE receiver requires its own SIR estimator.

Therefore, there is a need in the art for improved radio frequency (RF) receivers. In particular, there is a need for improved channel estimation filters for use in RAKE receivers. More particularly, there is a need for a MMSE channel estimation filter that is not specific to a particular Doppler frequency or SIR level provided the SIR is maintained within a reasonable limit by use of downlink power control.

SUMMARY OF THE INVENTION

The present invention comprises a low complexity channel estimation filter for a DS-CDMA RAKE receiver that is optimized to work on a range of Doppler frequencies using the average MMSE criterion. The filter structure of the present invention remains the same at all Doppler frequencies and SIR levels and is chosen to perform best on the ensemble average of all Doppler frequencies.

Channel estimation is performed on each RAKE finger in order to compensate for the complex channel gain that is associated with each multipath in a scattering environment. In order to estimate the channel gain, a known signal is required. The common pilot channel (CPICH) is the phase reference for all common channels and dedicated channels transmitted throughout the cell. The S-CPICH is the phase reference for dedicated channels transmitted using beam forming. The present invention uses whichever CPICH is the phase reference to estimate the channel gain.

Multiplying the de-spread data symbols by the conjugate of the channel gain can perform the channel compensation as well as weighting the inputs for maximal ratio combining. Channel estimation involves finding the mean of a non-stationary time series of de-spread CPICH symbols. The present invention uses a filter that effectively reduces the error in the estimate due to additive noise, while having a low delay for following the mean. In an advantageous embodiment, the present invention may be implemented entirely using a digital signal processor (DSP).

The method for the channel estimation follows the following steps:

1) Determine the ideal filter characteristics of a filter that minimize the mean square error in the channel estimate. This is done by assuming the Jake's spectrum for a particular Doppler frequency, taking the channel estimation mean square error spectrum at that Doppler, taking the mean of the mean squared error spectrum over all Doppler frequencies, and minimizing the result over the filter transfer function.

2) A discrete-time approximation of the obtained transfer function is performed using the MMSE criterion in order to derive a realizable filter at low complexity. According to an advantageous embodiment of the present invention, such a filter may be implemented as a cascade of a 3-tap finite impulse response (FIR) filter and a single pole infinite impulse response (IIR) filter. Such an embodiment is particularly useful because the operations involved can be performed in one cycle of any DSP with 4 simultaneous MAC operations.

3) A fixed-point realization of the filter was obtained where the filter coefficients as well as the data were 16-bit quantized. The quantization levels are chosen to minimize the overall degradation in the signal-to-noise ration (SNR) of the signal in overflow and underflow conditions.

To address the above-discussed deficiencies of the prior art, it is a primary object of the present invention to provide, for use in a RAKE receiver, a channel estimator for determining channel weighting coefficients for a finger of the RAKE receiver. According to an advantageous embodiment, the channel estimator comprises: 1) a first correlator for receiving a first pilot channel signal and correlating the first pilot channel signal with a first pilot channel chip pattern associated with the first pilot channel signal to produce an output comprising a first pilot channel symbol sequence; and 2) a first channel estimation filter capable of receiving the first pilot channel symbol sequence and generating first channel weighting coefficients, wherein the first channel estimation filter minimizes a mean squared error in the first channel weighting coefficients caused by additive noise and variation in the channel (Doppler effects), wherein the mean squared error is minimized across a range of Doppler frequencies from 0 Hz up to a predetermined maximum Doppler frequency.

According to one embodiment of the present invention, the first channel estimation filter comprises a cascade of a 3-tap finite impulse response (FIR) filter and a single pole infinite impulse response (IIR) filter.

According to another embodiment of the present invention, the single pole infinite impulse response (IIR) filter is a Butterworth filter having a maximally flat passband.

According to still another embodiment of the present invention, the channel estimator further comprises: 3) a second correlator for receiving a second pilot channel signal and correlating the second pilot channel signal with a second pilot channel chip pattern associated with the second pilot channel signal to produce an output comprising a second pilot channel symbol sequence; and 4) a second channel estimation filter capable of receiving the second pilot channel symbol sequence and generating second channel weighting coefficients, wherein the second channel estimation filter minimizes a mean squared error in the second channel weighting coefficients caused by additive noise and Doppler effects, wherein the mean squared error is minimized across a range of Doppler frequencies from 0 Hz up to a predetermined maximum Doppler frequency.

According to a further embodiment of the present invention, the second channel estimation filter comprises a cascade of a 3-tap finite impulse response (FIR) filter and a single pole infinite impulse response (IIR) filter.

According to a still further embodiment of the present invention, the channel estimator as set forth in claim 5 wherein the single pole infinite impulse response (IIR) filter is a Butterworth filter having a maximally flat passband.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 8, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged mobile station RAKE receiver.

Figure 1:
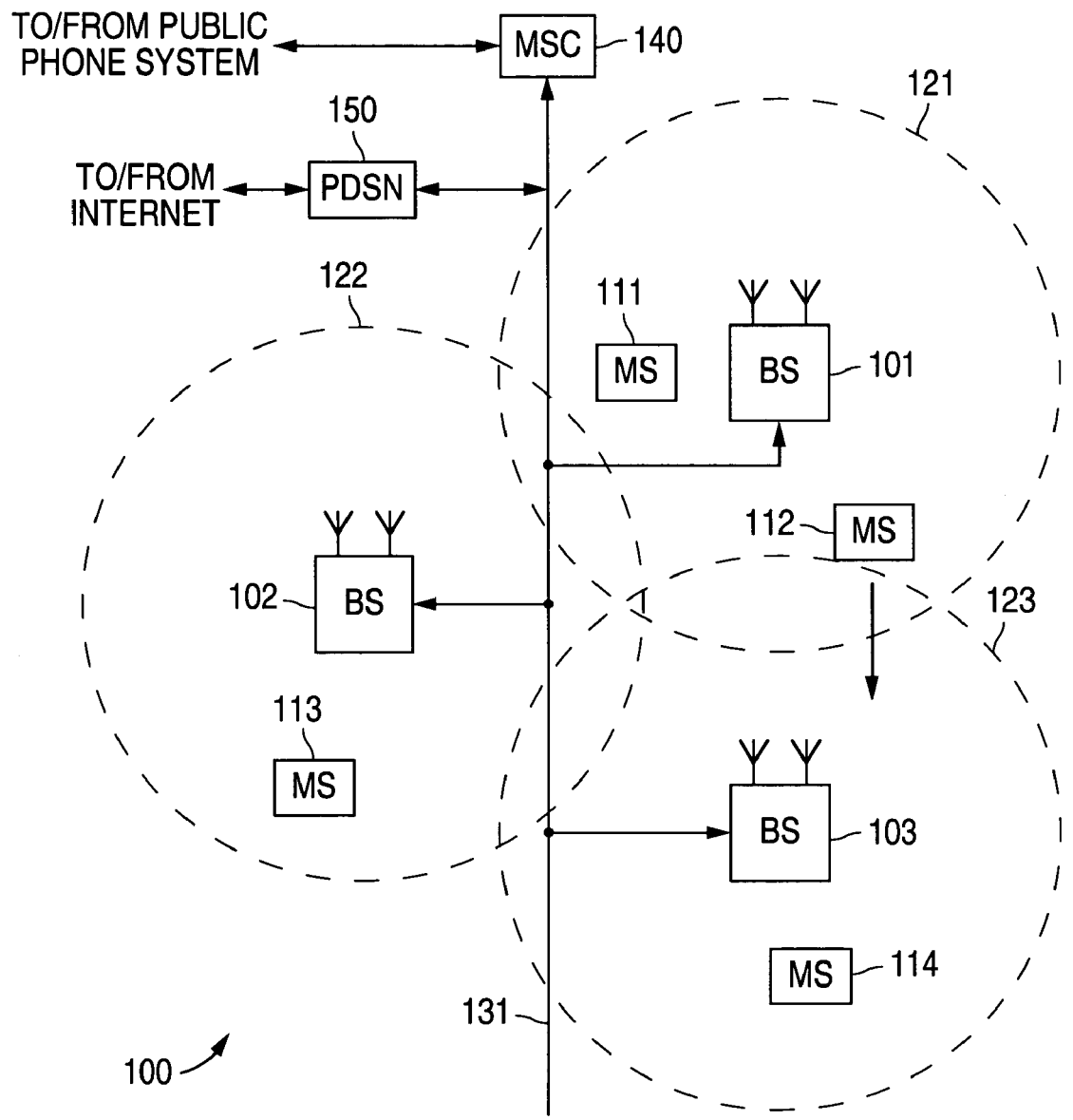
FIG. 1 illustrates an exemplary wireless network in which mobile station RAKE receivers using channel estimation techniques according to the principles of the invention may be used.

FIG. 1 illustrates exemplary wireless network 100, in which mobile station RAKE receivers using channel estimation techniques according to the principles of the present invention may be used. Wireless network 100 comprises a plurality of cell sites 121-123, each containing a base station (BS), such as BS 101, BS 102, or BS 103. Base stations 101-103 communicate with a plurality of mobile stations (MS) 111-114 over, for example, code division multiple access (CDMA) channels. Mobile stations 111-114 may be any suitable wireless devices, including conventional cellular radiotelephones, Personal Communication Services (PCS) handset devices, personal digital assistants, portable computers, or metering devices. The present invention is not limited to mobile devices. Other types of access terminals, including fixed wireless terminals, may be used. However, for the sake of simplicity, only mobile stations are shown and discussed hereafter.

Dotted lines show the approximate boundaries of the cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121-123 are comprised of a plurality of sectors (not shown), each sector being illuminated by a directional antenna coupled to the base station. The embodiment of FIG. 1 illustrates the base station in the center of the cell. Alternate embodiments position the directional antennas in corners of the sectors. The system of the present invention is not limited to any particular cell site configuration.

In one embodiment of the present invention, BS 101, BS 102, and BS 103 comprise a base station controller (BSC) and one or more base transceiver subsystem(s) (BTS). Base station controllers and base transceiver subsystems are well known to those skilled in the art. A base station controller is a device that manages wireless communications resources, including the base transceiver stations, for specified cells within a wireless communications network. A base transceiver subsystem comprises the RF transceivers, antennas, and other electrical equipment located in each cell site.

BS 101, BS 102 and BS 103 transfer voice and data signals between each other and the public switched telephone network (PSTN) (not shown) and the Internet via communication line 131, mobile switching center (MSC) 140, and packet data serving node (PDSN) 150. MSC 140 is a switching device that provides services and coordination between the subscribers in a wireless network and external networks, such as the PSTN or Internet.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

The base stations may transmit from a single antenna or from two antennas. If two antennas are used, the base stations may use transmit diversity (e.g., space-time transmit diversity (STTD)) by coding data in a space-time code and transmitting the pilot symbols in an orthogonal pattern, such as the pattern illustrated in FIG. 2.

Figure 2:
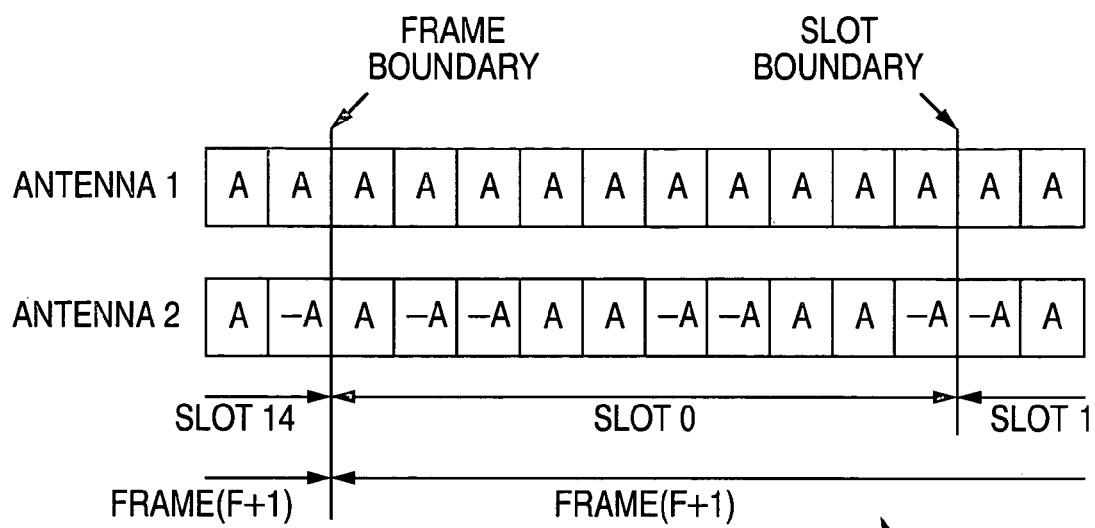
FIG. 2 is a timing diagram illustrating the modulation pattern for the common pilot channel (CPICH) signals in the wireless network in FIG. 1 according to an exemplary embodiment of the present invention.

FIG. 2 illustrates timing diagram 200, which depicts the modulation pattern for the common pilot channel (CPICH) signals in wireless network 100 according to an exemplary embodiment of the present invention. In FIG. 1, each of BS 101-BS 103 has two antennas that may be used to communicate with MS 111-MS 114. Each of base stations 101-103 may use a single antenna to communicate in a non-transmission diversity (non-TD) mode with the mobile stations. However, in an advantageous embodiment of the present invention, each of base stations 101-103 may combat the effects of multipath fading by transmitting from two antennas in a space-time transmit diversity (STTD) mode.

In an exemplary embodiment, wireless network 100 is compatible with the $3^{rd}$ Generation Partnership Project (3GPP) standard. In a 3GPP system, during non-TD mode, a common pilot channel (CPICH) signal is transmitted as a quadrature signal from a single antenna using the pattern shown for Antenna 1 in FIG. 2, where A=1+j. During STTD mode, a first common pilot channel (CPICH) signal is transmitted as a first quadrature signal from a first antenna using the pattern shown for Antenna 1 in FIG. 2, and a second common pilot channel (CPICH) signal is transmitted as a second quadrature signal from a second antenna using the pattern shown for Antenna 2 in FIG. 2.

Figure 3:
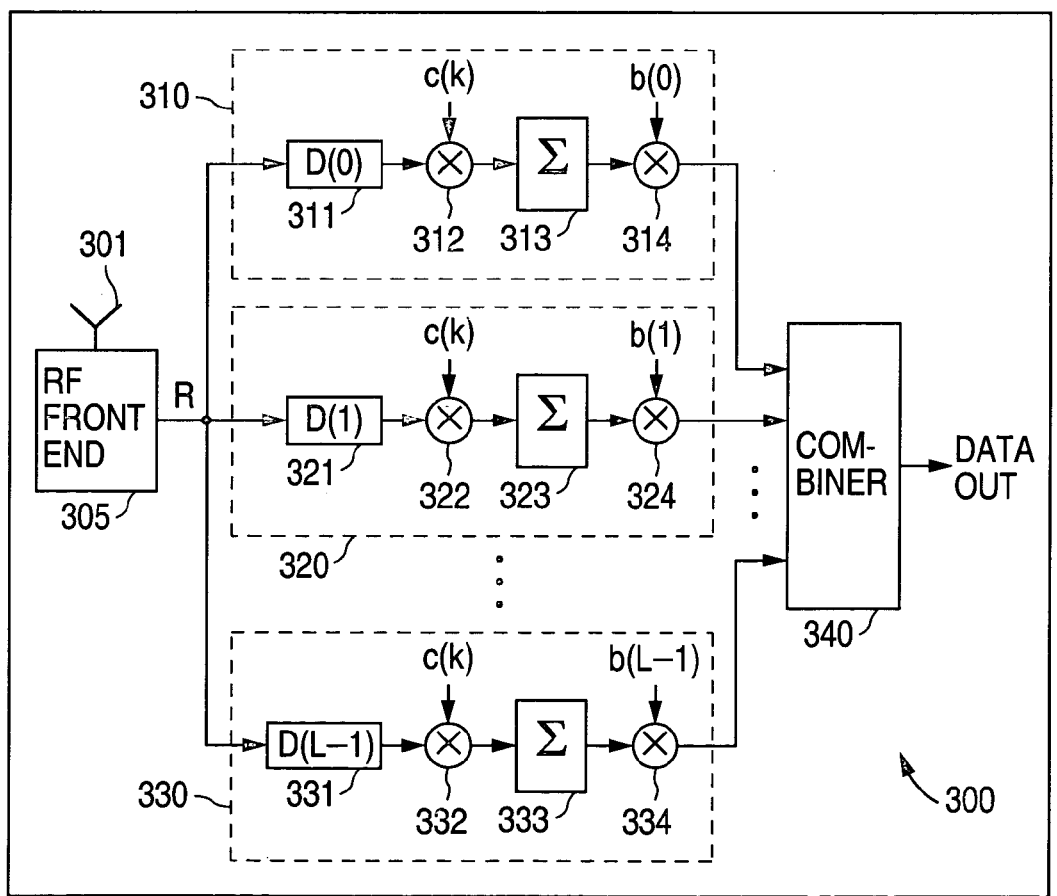
FIG. 3 is a high-level block diagram of a RAKE receiver in an exemplary mobile station according to one embodiment of the present invention.

FIG. 3 is a high-level block diagram of RAKE receiver 300 in exemplary mobile station 111 according to one embodiment of the present invention. RAKE receiver comprises antenna 301, radio frequency (RF) front-end block 305, L fingers, including exemplary fingers 310, 320 and 330, and combiner 340. Finger 310 comprises delay element 311, multiplier 312, summer 313 and multiplier 314. Finger 320 comprises delay element 321, multiplier 322, summer 323 and multiplier 324. Finger 330 comprises delay element 331, multiplier 332, summer 333 and multiplier 334.

RF front-end block 305 downconverts the incoming RF signals received from antenna 301 and produces a baseband or intermediate frequency signal, which is sampled and quantized by an analog-to-digital converter (ADC) to produce a sequence of digital values, the signal R. The signal R is supplied as the input to each of the L fingers. In each of the L fingers, there is a correlator formed by a multiplier and a summer. For example, in finger 310, the correlator is formed by multiplier 312 and summer 313, in finger 320, the correlator is formed by multiplier 322 and summer 323, and in finger 330, the correlator is formed by multiplier 332 and summer 333.

In each finger, the signal R is initially delayed by some time delay D(n) by the delay elements. The output of each delay element is the input of the correlator for that finger. Thus, the correlators are synchronized to each of the L strongest multipath components by delaying the received signal R in each finger by an appropriate amount of time D(n). The delayed samples of the received signal R are then correlated with the chip pattern, c(k), to produce a correlated output. The correlated outputs of the correlators are then weighted by coefficients b(n) by the multipliers 314, 324, and 334. Combiner 340 combines the weighted outputs 340 and the resulting DATA OUT signal is the baseband signal.

According to the principles of the present invention, the weighting coefficients b(n) in each of the L fingers of RAKE receiver 300 are calculated by a channel estimation filter that uses the pilot channel signals transmitted by base stations 101, 102, and 103 and that optimizes the weighting coefficients b(n) over a range of Doppler frequencies using the average MMSE criterion. In an advantageous embodiment of the present invention, a digital signal processor (DSP) performs channel estimation.

Figure 4:
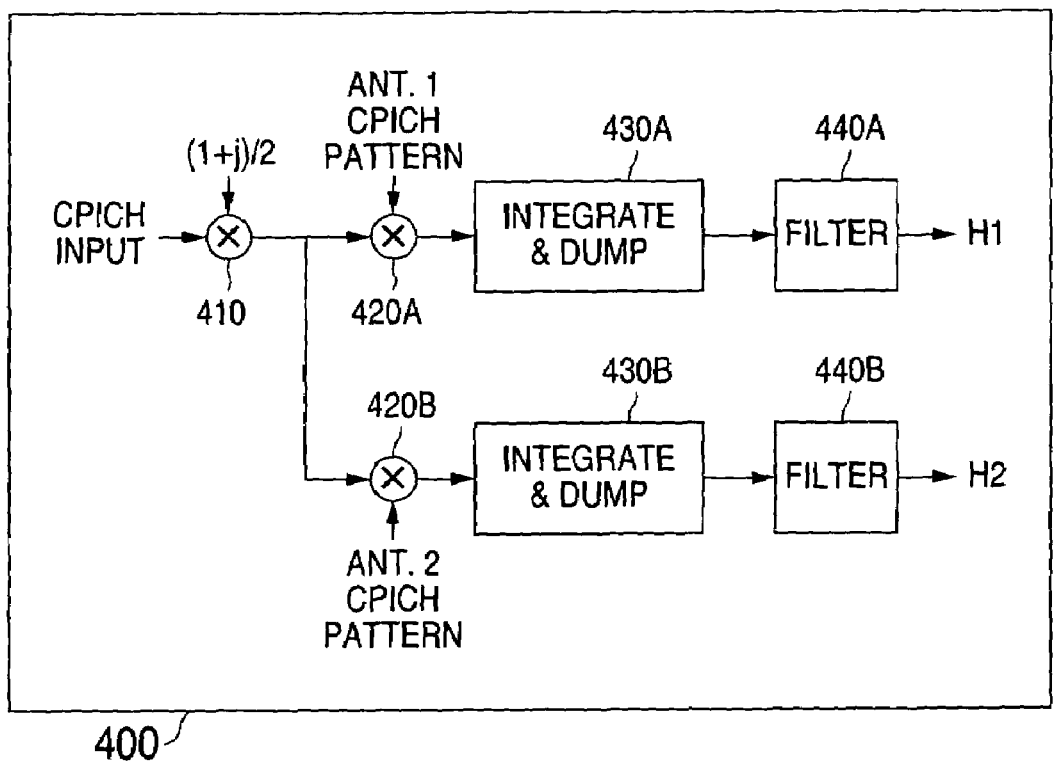
FIG. 4 is a block diagram of a channel estimator according to an exemplary embodiment of the present invention.

FIG. 4 is a block diagram of channel estimator 400 according to an exemplary embodiment of the present invention. There is one channel estimator for each active finger. The inputs to channel estimator 400 are the integrated CPICH symbols and the CPICH symbol pattern(s) for each antenna. The output(s) are the channel estimates for each antenna-to-antenna path.

Channel estimator 400 comprises multipliers 410, 420A and 420B, integrate and dump blocks 430A and 430B and channel estimation filters 440A and 440B. It is noted that the elements in FIG. 4 may be actual circuits in a fixed embodiment. However, if the RAKE receiver is implemented in a digital signal processor (DSP), the elements in FIG. 4 may be logical functional blocks, rather than literal circuits.

Multiplier 410 receives pilot channel signal(s), CPICH, from a pilot signal correlator. In non-TD mode, a single pilot channel signal is received as a sequence of complex number symbols. In STTD mode, two pilot channel signals are received as a sequence of complex number symbols. Multiplier 410 multiplies the CPICH input by the complex number (1+j)/2. The output of multipliers 410 is sent to two correlators. The first correlator comprises multiplier 420A, integrate and dump block 430A, and channel estimation filter 440A. The first correlator produces the channel estimates, H1, a complex number. The second correlator comprises multiplier 420B, integrate and dump block 430B, and filter 440B. The second correlator produces the channel estimates, H2, a complex number. H1 and H2 are used as the weighting coefficients (i.e., b(n)) for the fingers of the RAKE receiver.

Multiplier 420A multiplies the complex symbol output of multiplier 410 by the pilot channel chip pattern for Antenna 1 (i.e., ANT. 1 CPICH PATTERN). The output of multiplier 420A is input to integrate and dump block 430A, which integrates two symbols at a time (i.e., 256 chips per symbol) and outputs (dumps) the integrated symbol pairs (i.e., 512 chips) to channel estimation filter 440A.

In STTD mode, multiplier 420B multiplies the complex symbol output of multiplier 410 by the pilot channel chip pattern for Antenna 2 (i.e., ANT. 2 CPICH PATTERN). The output of multiplier 420B is input to integrate and dump block 430B, which integrates two symbols at a time (i.e., 256 chips per symbol) and outputs (dumps) the integrated symbol pairs (i.e., 512 chips) to channel estimation filter 440B.

Channel estimation is required to be performed on each RAKE finger in order to compensate for the complex channel gain associated with each multipath in a scattering environment. In order to estimate the channel gain, a known signal is required. The common pilot channel P-CPICH is the phase reference for all common channels and dedicated channels transmitted throughout the cells in wireless network 100. The common pilot channel S-CPICH is the phase reference for dedicated channels transmitted using beam forming. In either event, whichever CPICH is present is used as the phase reference for estimating the channel gain.

Multiplying the despreaded data symbols by the conjugate of the channel gain can perform the channel compensation as well as weighting the inputs for maximal ratio combining. Fundamentally, the process of channel estimation is an estimation problem of finding the mean of a nonstationary time series of despreaded CPICH symbols. The objective is to use a filter that effectively reduces the error in the estimate due to additive noise, while having a low delay for following the mean value.

The starting point for constructing such a channel estimation filter is to consider the ideal characteristics expected from a channel estimation filter. The combination of the channel gains on each of the RAKE fingers define the entire channel (almost completely) as:

$$h(n, k) = \sum_{l=1}^{L} (c_r(k) + jc_i(k))_l \delta(n - d_l)$$

After passing through this channel, the received and integrated pilot channel symbols can be represented as:

$$r_l(t) = A_p(1+j)\delta(n - d_l) * (h(n,k) + \eta(n,k))_l$$

The channel estimator derotates the original 45° rotation in the pilot symbols and filters the output with a real filter. This operation may be represent by:

$$(\hat{c}_{1r}(k) + j\hat{c}_{1i}(k))_l = g(k) * \frac{(1-j)}{2} \delta(m - d_l) * r(m, k)$$

The channel gain estimators act on the pilot signals demodulated by each RAKE finger. The pilot signals are perturbed by noise. Thus, the output of each channel estimator is:

$$(\hat{c}_r(k) + j\hat{c}_i(k))_l = A_p g(k) * \delta(n - d_l) * (h(n,k) + \eta(n,k))$$

$$\Rightarrow (\hat{c}_r(k) + j\hat{c}_i(k))_l = A_p g(k) * (c_r(k) + jc_i(k) + \eta(k))_l$$

where $A_p$ is the pilot amplitude, r(n) is the rake finger output and g(n) is the channel estimator.

The noise process perturbing the real and imaginary component of the channel gain on each finger is Gaussian (or nearly so). Hence, the optimum criterion for the channel gain estimators on each finger is to minimize the mean square error (MSE) of the estimates.

$$e_l(k) = [(c_r(k) + jc_i(k))_l - (\hat{c}_r(k) + j\hat{c}_i(k))_l]$$

By Parseval's theorem, minimizing MSE in the time domain is equivalent to minimizing MSE in the frequency domain. In the frequency domain, the following model may be considered:

$$\hat{H}(f) = G(f)[H(f) + N(f)]$$

The problem is to find G(f) such that:

$$G(f): \min_{G(f)} \int_{f_m=0}^{f_{\max}} p(f_m) E_\theta \{|H(f, f_m, \theta) - \hat{H}(f)|^2\} df_m =$$

$$\min_{G(f)} E_{f_m}\{E_\theta\{|H(f, f_m, \theta) - \hat{H}(f)|^2\}\},$$

which leads to:

$$G(f) = \left(\frac{\Omega + \sigma_N^2}{\Omega}\right) \frac{E_{f_m}\{\Phi(f, f_m)\}}{E_{f_m}\{\Phi(f, f_m)\} + \sigma_N^2}.$$

In order to proceed further, it is necessary to assume a probability density function (PDF) for Doppler frequency. It may be assumed (for lack of any definitive data) that the velocity of the mobile stations may be distributed uniformly from 0 kilometers per hour (kmph) to 250 kmph. Then:

$$\Psi(f) = E_{f_m}\{\Phi(f, f_m)\} = \int_{f_m=0}^{f_{\max}} \frac{\Omega}{4\pi f_m \sqrt{1 - (f/f_m)}} \frac{df_m}{f_{\max}}$$

Figure 5:
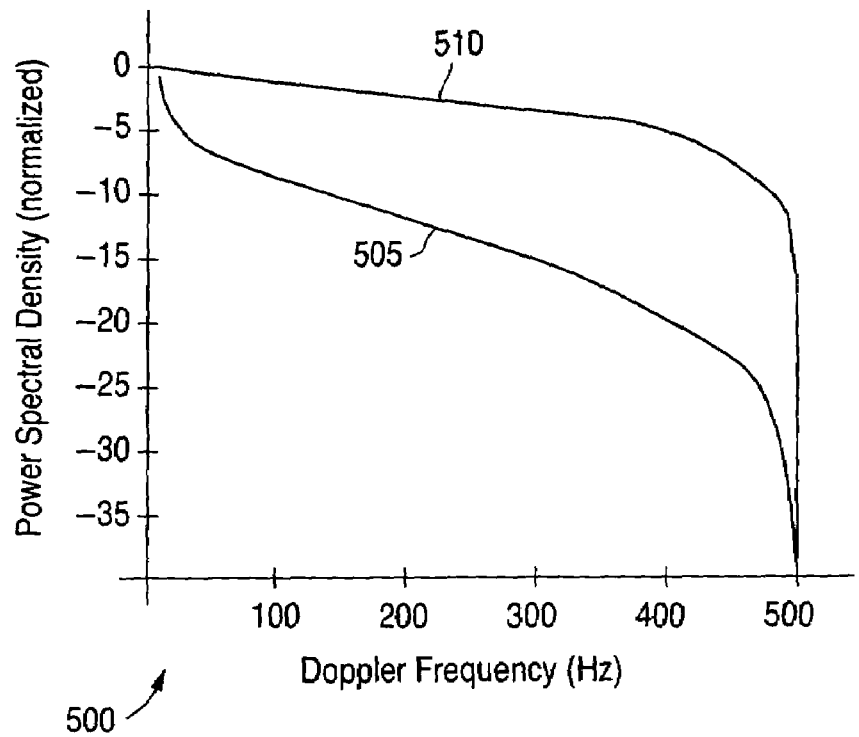
FIG. 5 is a graph illustrating the power spectral density of the received signal averaged over the entire range of Doppler frequencies when the vehicle speed is a uniformly distributed random variable (with maximum Doppler frequency of 500 Hz) and the ideal channel estimation filter, G(f), in the wireless network.

This is plotted as in FIG. 5. FIG. 5 illustrates graph 500, which depicts the power spectral density of the received signal averaged in curve 505 over the entire range of Doppler frequencies when the vehicle speed is an uniformly distributed random variable (with maximum Doppler frequency of 500 Hz) and the ideal channel estimation filter, G(f), in curve 510. As can be seen, the fall is quite sharp at 500 Hz. In fact, there are no components beyond 500 Hz, which roughly corresponds to the maximum Doppler frequency at 2 GHz when the mobile speed is 250 kmph.

For a non-TD system, the sampling frequency is 15 kHz, corresponding to integration of 256 pilot chips. Hence, a digital filter needs to be constructed that closely approximates the G(f) in FIG. 5 with a Nyquist frequency of 7.5 kHz, thereby satisfying complexity constraints.

According to an advantageous embodiment of the present invention, a second-order filter may be used. Since the overriding aim is to have small attenuation in the stopband, an equiripple pass band filter may be used. To keep the stopband attenuation minimum, an equiripple 30 dB stopband and a 1 dB passband attenuation elliptic filter may be used.

Figure 6:
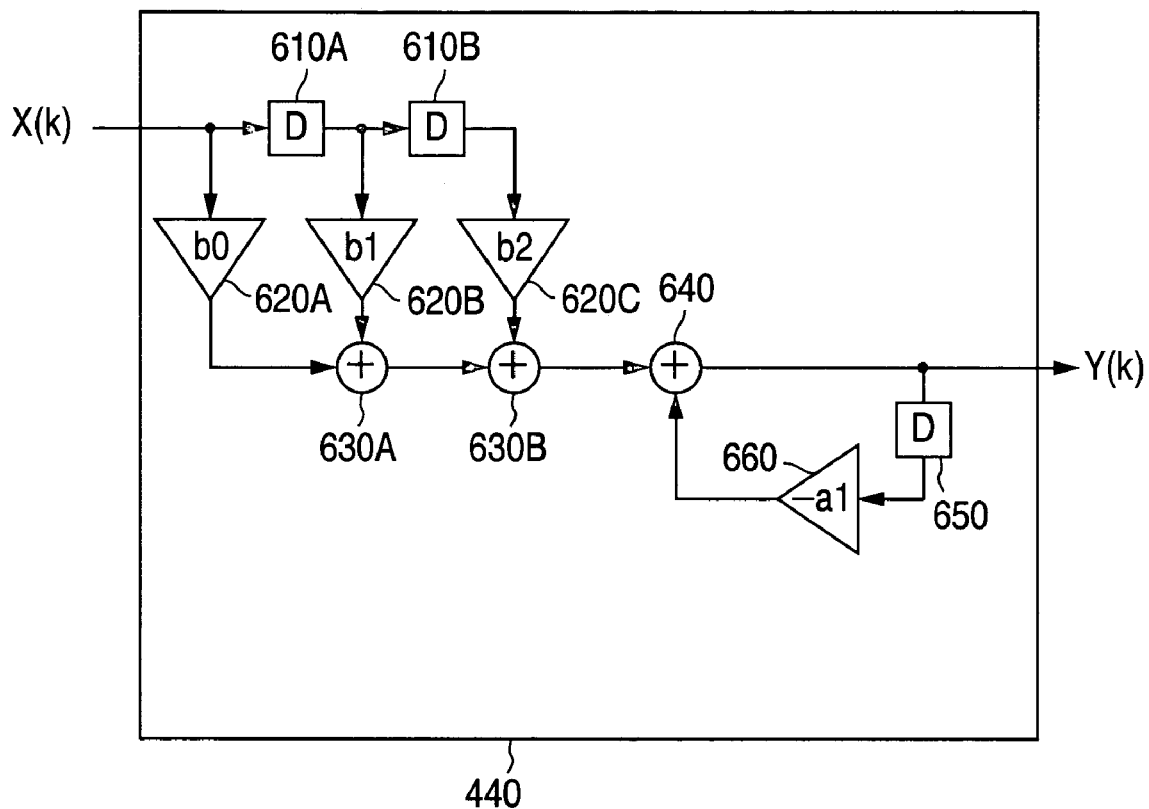
FIG. 6 illustrates a channel estimation filter for calculating weighting coefficients in a RAKE receiver according to an exemplary embodiment of the present invention.

FIG. 6 illustrates channel estimation filter 440 according to an exemplary embodiment of the present invention. A preferred digital signal processor (DSP) can perform 4 MAC operations simultaneously. A Butterworth filter involves 2 MAC operations, while a elliptic (or any other $2^{nd}$ order) filter involves 5 AMC operations. One effective way to use the DSP to its fullest advantage is to use a 3-tap finite impulse response (FIR) filter followed by a Butterworth stage as shown in FIG. 6.

Channel estimation filter 440 comprises a FIR filter stage and a Butterworth filter stage (also known as maximally flat low pass filter stage). The filter stage receives the input X(k). The FIR filter stage comprises delay elements 610A and 610B, multipliers 620A, 620B and 620C, and adders 630A and 630B. The Butterworth Filter stage comprises delay elements 650 and multiplier 660. Adder 640 adds the output of the FIR filter stage and the Butterworth filter stage to produce the filtered output Y(k).

A first order approximation of the filter above will be a Butterworth filter. The 3 dB cutoff frequency of the filter may be chosen to match that of the ideal filter. This is around 300 Hz.

The corresponding filter has the form:

$$G(z) = \frac{0.0592(1+z^{-1})}{1-0.8816z^{-1}}$$

A first order filter will involve two multiplications and additions. A first order filter may approximate the optimal filter based on expected channel psd well, however, it produces a significant attenuation (~6 dB @ 500 Hz) in the passband when the highest Doppler is in use.

However, a cascade of a FIR filter and a Butterworth filter overcomes the problems of a first order Butterworth filter by itself. In the cascade design, the Butterworth filter design may be kept identical to the one described above as it follows the passband quite closely. The FIR stage may be designed to add additional attenuation in the stopband while keeping very low attenuation in the passband.

The equal tap FIR stage of:

$$G_F(z) = 0.333(1+z^{-1}+z^{-2})$$

gives an attenuation of less than 0.13 dB at 500 Hz and more than 10 dB from 3800 Hz and beyond.

Delaying the despreaded data by one sample prior to channel compensation compensates for the extra sample of group delay caused by the FIR stage. Thus, the combined filter is:

$$G(z) = \frac{0.0395(z+1+z^{-1})}{1-0.8816z^{-1}}.$$

STTD Mode of Operation

The mobile station conducts a secondary search to determine whether the base station is using the space-time transmit diversity (STTD) mode of operation. Once it is determined that STTD mode is being used, a STTD channel estimation technique is used.

In the STTD mode there are two channels to be estimated, the channel from the first base station (BS) antenna (i.e., Antenna 1) to the mobile station (MS), $h_1(t)$, and the channel from the second BS antenna to the MS, $h_2(t)$. In STTD mode of operation the two antennas transmit the pilot channel bit patterns in phase and in anti-phase alternatively, as shown in FIG. 2. Hence, the received and integrated CPICH symbols on each finger will follow the pattern:

$$r_l(t) = A_p(1+j)\delta(n-d_l)*(h_1(n,k) + a_n h_2(n,k) + \eta(n,k))_l,$$

where $\alpha a_n \in \{-1, 1\}$ forms the phase sequence of the second antenna's CPICH transmission.

Hence, at any given time the effective received channel is the sum or the difference of the two channels.

There are two methods for performing channel estimation:

1) Method 1: Estimate the sum and differences of the channel separately by integrating separately over intervals when the CPICH transmissions are in-phase and out-of-phase. The individual channels can then be calculated by taking the sum and the difference; and 2) Method 2: Integrate over intervals where the in-phase and out-of-phase intervals are matched equally to produce super-symbols. By choosing the sign of the despreading code, either the first or the second channel may be estimated.

The advantages and disadvantages are of these methods are:

1) Method 1: The order of pilot symbols where the CPICH is from the first and second antennas are the same (or different) signs is not periodic. This means the first method requires housekeeping for symbol counts. Also, because of this aperiodic characteristic, the filter either must run at symbol rate or have special operations at symbol boundaries.

2) Method 2: The sampling frequency gets halved leading to a 50% MIPS or power savings. Also, no housekeeping beyond counting even and odd symbols is necessary.

The second approach is preferred in this algorithm.

The operation involved is:

$$(\hat{c}_{1r}(k) + j\hat{c}_{1i}(k))_l = \begin{cases} g(k) * \frac{1}{2} \sum_{m=n-1}^{n} \frac{(1-j)}{2}\delta(m-d_l)*r(m,k) & n = 2\lfloor n/2 \rfloor + 1 \\ g(k) * \frac{1}{2} \sum_{m=n-2}^{n-1} \frac{(1-j)}{2}\delta(m-d_l)*r(m,k) & n = 2\lfloor n/2 \rfloor \end{cases}$$

for Antenna 1, and $$(\hat{c}_{2r}(k) + j\hat{c}_{2i}(k))_l = \begin{cases} g(k) * \frac{1}{2} \sum_{m=n-1}^{n} \frac{(1-j)}{2} a_m \delta(m-d_l)*r(m,k) & n = 2\lfloor n/2 \rfloor + 1 \\ g(k) * \frac{1}{2} \sum_{m=n-2}^{n-1} \frac{(1-j)}{2} a_m \delta(m-d_l)*r(m,k) & n = 2\lfloor n/2 \rfloor \end{cases}$$

for Antenna 2.

The resulting output from each channel estimator is:

$$(\hat{c}_{sr}(k) + j\hat{c}_{sl}(k))_l = A_p g(k) * \delta(n-d_l) * (h_s(n,k) + \eta_s(n,k))$$
$$s = 1, 2$$

$$\Rightarrow (\hat{c}_{sr}(k) + j\hat{c}_{sl}(k))_l = A_p g(k) * (c_{sr}(k) + jc_{sl}(k) + \eta_s(k))_l$$

Note that due to averaging, the variance of the noise samples $\eta_{sl}(k)$ is half of that of the non-TD case $\eta_l(k)$.

The filter itself can take the same form as in FIG. 6. However, because the filtering is taking place over super-symbols (which are the sum of two consecutive symbols), the sampling frequency is halved to 7.5 kHz. Hence, the filter coefficients must be adjusted accordingly.

FIR-Butterworth Combination

The Butterworth filter in the non-TD design was designed to have a 3 dB cutoff frequency at 300 Hz. For a sampling frequency of 7500 Hz, the corresponding filter will be:

$$G_{But}(z) = \frac{0.11216(1+z^{-1})}{1-0.77568z^{-1}}$$

Note that both the pole position is closer to 0.5, leading to a filter design with lesser vulnerability to quantization error. The combined filter is obtained by cascading the FIR filter and the Butterworth filter stages:

$$G(z) = 0.12818 \frac{0.5 + 0.75z^{-1} + 0.5z^{-2}}{1-0.77568z^{-1}}.$$

Figure 7:
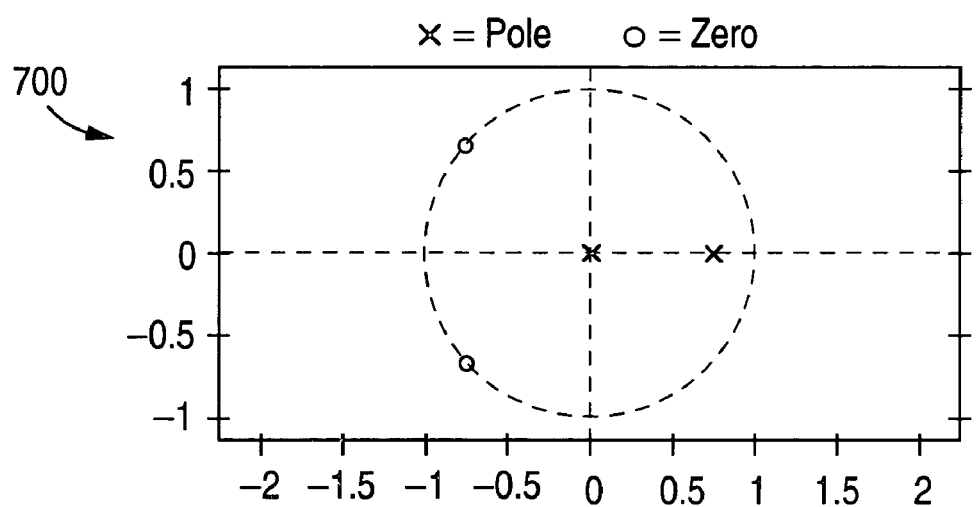
FIG. 7 illustrates a pole-zero plot for a channel estimation filter in accordance with the principles of the present invention.

FIG. 7 illustrates pole-zero plot 700 for a channel estimation filter in accordance with the principles of the present invention. Note that the pole position is well inside the unit circle leading to a filter design with more stability, better response time, lesser group delay and lesser vulnerability to quantization error.

Symbol De-Rotation in STTD Mode

In STTD mode, the transmitted symbols are transmitted from Antennas 1 and 2 of the base stations in the following fashion:

| Transmission Time | Antenna 1 symbol | Antenna 2 Symbol |
|---|---|---|
| 2m | $S_{2m}$ | $-S^*_{2m+1}$ |
| 2m + 1 | $S_{2m+1}$ | $S^*_{2m}$ |

It is assumed that the first symbol interval in the frame was symbol interval 0. Hence, the received symbols on even symbol intervals are:

$$r_{2m} = h_1 S_{2m} - h_2 S^*_{2m+1} + \eta_{2m}.$$

Similarly, the received symbols on odd symbol intervals are:

$$r_{2m+1} = h_1 S_{2m+1} + h_2 S^*_{2m} + \eta_{2m+1}.$$

The optimal de-rotation for the received symbol on even symbol interval is:

$$\hat{S}_{2m} = h_1^* r_{2m} + h_2 r^*_{2m+1}$$
$$= (|h_1|^2 + |h_2|^2) S_{2m} + (h_1^* \eta_{2m} + h_1 \eta^*_{2m+1})$$

The optimal de-rotation on odd symbol interval is:

$$\hat{S}_{2m+1} = -h_1^* r_{2m} + h_2 r^*_{2m+1}$$
$$= (|h_1|^2 + |h_2|^2) S_{2m+1} + (-h_2 \eta^*_{2m} + h_1^* \eta_{2m+1}).$$

Figure 8:
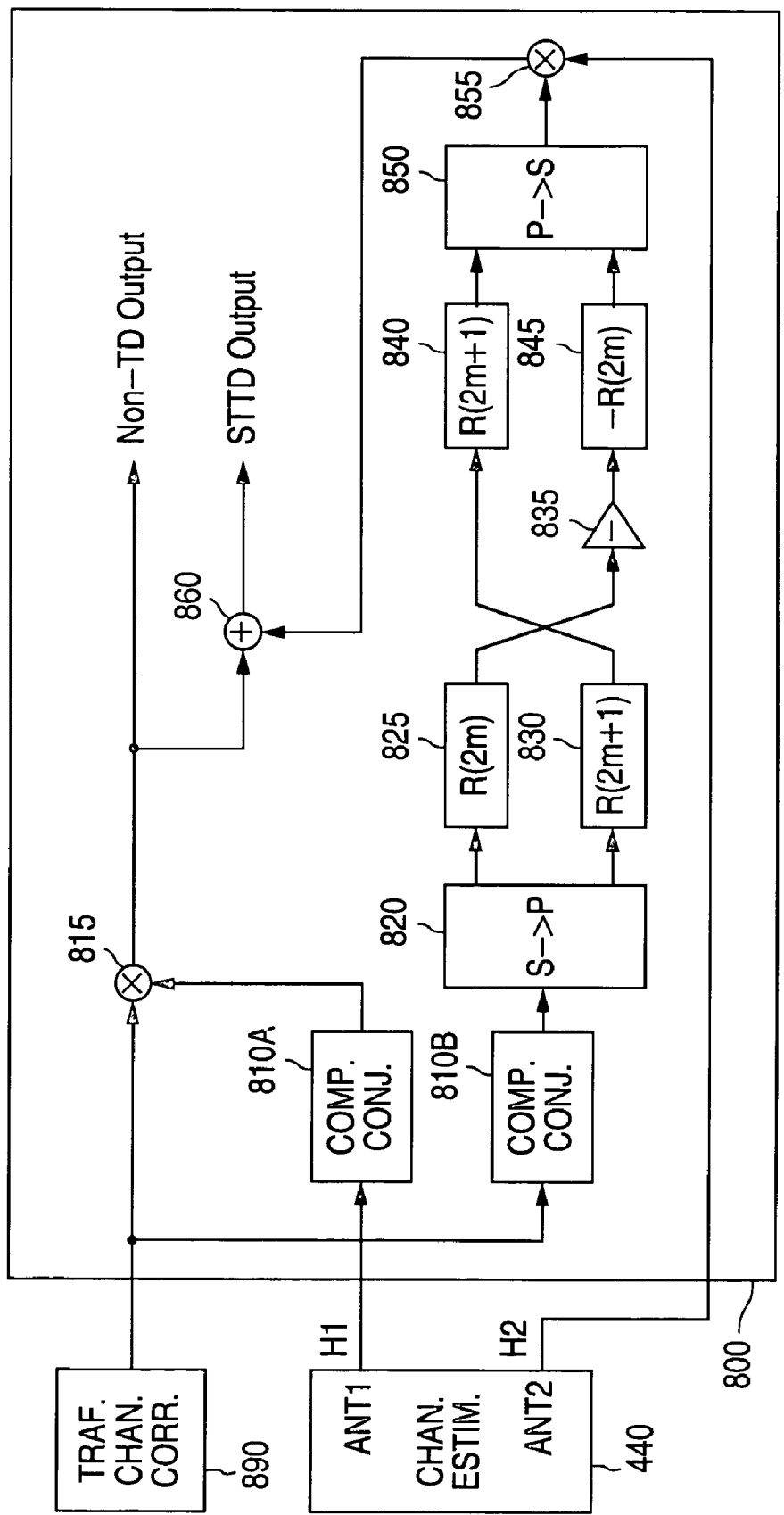
FIG. 8 illustrates a symbol de-rotator according to an exemplary embodiment of the present invention.

FIG. 8 illustrates symbol de-rotator 800 according to an exemplary embodiment of the present invention. There is one symbol de-rotator for every physical channel (other than CPICH) in every finger. The inputs to the symbol de-rotator are the integrated traffic channel (common or dedicated) symbols and the channel estimate(s) H1 and H2 from channel estimator 440. The outputs of symbol de-rotator 800 are the channel compensated symbols ready for combining. As in the case of FIG. 4, it is noted that the elements in FIG. 8 may be actual circuits in a fixed embodiment. However, if the RAKE receiver is implemented in a digital signal processor (DSP), the elements in FIG. 8 may be logical functional blocks, rather than literal circuits.

Symbol de-rotator 800 has a Non-TD Output and a STTD Output. In non-TD mode, each channel estimate, H1, from channel estimator 400 is complex conjugated by complex conjugate block 810A and the output is applied to one input of multiplier 815. The other input of multiplier 815 receives the traffic channel symbols from traffic channel correlator 890. The output of multiplier 815 is the channel compensated symbols that form the Non-TD Output.

In STTD mode, complex conjugate block 810A and multiplier 815 operate as in non-TD mode. The Non-TD output is applied to a first input of summer 860.

The traffic channel symbols from traffic channel correlator 890 are complex conjugated by complex conjugate block 810B and the output is applied to serial-to-parallel (S>P) block 820, which converts the symbol data from serial to parallel. Alternating symbols from S>P block 820 are stored in registers 825 and 830. Even symbols (i.e., symbol 2m) are stored in register 825 and odd symbols are stored in register 830 (i.e., symbol 2m+1). The symbol data in register 830 is transferred to register 840, but the symbol data in register 825 is negated by inverter 835 and then stored in register 845. The symbol data in registers 840 and 845 are then read by parallel-to-serial (P>S) block 850.

The serial symbol data from P>S block 850 is multiplied by the channel estimate, H2, from channel estimator 440 by multiplier 855. The channel compensated symbols from multiplier 855 are then combined with the channel compensated symbols from the Non-TD Output to form the STTD Output.

The prior art includes a Wiener filter-based MMSE channel estimation that requires knowledge of SIR and Doppler. Hence it requires a Doppler and SIR estimator. The filter structure will change dynamically when these quantities change. The present invention overcomes numerous disadvantages of the prior art including:

1) There is no need for a Doppler estimator or a per finger SIR estimator;

2) The filter structure does not change with changes in is Doppler and SIR; and

3) There is not need for time-intensive calculation, such as matrix inversions.

These improvements make the design simpler, consume less power, require less silicon area, and the like.

The present invention performs sub-optimally compared to the prior art at a particular Doppler value and SIR setting. However, the present invention gives the best performance for the ensemble average for all Doppler settings and performance simulations demonstrate acceptable performance at the entire range of expected Doppler frequencies. The SIR level is typically maintained constant under closed-loop power control and hence this advantage of the related art is of little practical value.

Although the present invention has been described with several embodiments, various changes and modifications may be suggested to one skilled in the art. It is intended that the present invention encompass such changes and modifications as fall within the scope of the appended claims.

What is claimed is:

1. A channel estimator for determining channel weighting coefficients for a finger of a RAKE receiver, said channel estimator comprising:

a correlator configured to receive a pilot channel signal and to correlate said pilot channel signal with a pilot channel chip pattern to produce a pilot channel symbol sequence; and a channel estimation filter configured to receive said pilot channel symbol sequence and to generate channel weighting coefficients, wherein said channel estimation filter is configured to minimize a mean squared error of a channel estimate in said channel weighting coefficients caused by at least one of: additive noise and Doppler effects, wherein said mean squared error is minimized across a range of Doppler frequencies from 0 Hz up to a specified maximum Doppler frequency;

wherein the channel estimation filter comprises a first filter, a second filter, and an adder, the adder configured to sum outputs of the first and second filters, and inputs of the second filter comprising outputs of the adder.

2. The channel estimator as set forth in claim 1 wherein said channel estimation filter is configured to minimize an average mean squared error over the entire Doppler range assuming that a mobile station velocity is uniformly distributed.

3. The channel estimator as set forth in claim 2 wherein said channel estimation filter is configured to minimize the average mean squared error over the entire Doppler range assuming a power spectral density of the received pilot channel signal follows a Jake's spectrum.

4. The channel estimator as set forth in claim 1 wherein said first filter comprises a 3-tap finite impulse response (FIR) filter and the second filter comprises a single pole infinite impulse response (IIR) filter.

5. The channel estimator as set forth in claim 4 wherein said single pole infinite impulse response (IIR) filter is a Butterworth filter having a maximally flat passband.

6. The channel estimator as set forth in claim 1 wherein one of the first and second filters in said channel estimation filter comprises a single pole infinite impulse response (IIR) filter which is a Butterworth filter having a maximally flat passband.

7. The channel estimator as set forth in claim 1 further comprising:

a second correlator configured to receive a second pilot channel signal and to correlate said second pilot channel signal with a second pilot channel chip pattern to produce a second pilot channel symbol sequence; and a second channel estimation filter configured to receive said second pilot channel symbol sequence and to generate second channel weighting coefficients, wherein said second channel estimation filter is configured to minimize a second mean squared error of a second channel estimate in said second channel weighting coefficients caused by at least one of: the additive noise and the Doppler effects, wherein said second mean squared error is minimized across the range of Doppler frequencies.

8. The channel estimator as set forth in claim 7 wherein said channel estimation filter is configured to minimize a second average mean squared error over the entire Doppler range assuming that a mobile station velocity is uniformly distributed.

9. The channel estimator as set forth in claim 8 wherein said channel estimation filter is configured to minimize the second average mean squared error over the entire Doppler range assuming a power spectral density of the received second pilot channel signal follows a Jake's spectrum.

10. The channel estimator as set forth in claim 7 wherein said second channel estimation filter comprises a cascade of a 3-tap finite impulse response (FIR) filter and a single pole infinite impulse response (IIR) filter.

11. The channel estimator as set forth in claim 10 wherein said single pole infinite impulse response (IIR) filter is a Butterworth filter having a maximally flat passband.

12. The channel estimator as set forth in claim 7 wherein said second channel estimation filter comprises a single pole infinite impulse response (IIR) filter which is a Butterworth filter having a maximally flat passband.

13. The channel estimator as set forth in claim 7, further comprising:

a first multiplier configured to multiply the channel weighting coefficients and the pilot channel symbol sequence to produce first weighted outputs;

a second multiplier configured to multiply the second channel weighting coefficients and the second pilot channel symbol sequence to produce second weighted outputs; and a combiner configured to sum the first and second weighted outputs to produce an output signal.

14. The channel estimator as set forth in claim 1, wherein the range of Doppler frequencies comprises a range from 0 Hz to 500 Hz.

15. A RAKE receiver comprising:

a radio frequency (RF) front-end configured to receive an incoming RF signal and to down-convert and digitize said RF signal to a baseband or intermediate signal comprising a sequence of digital samples;

multiple finger elements, each of said finger elements configured to delay and correlate a received copy of said sequence of digital samples to thereby produce a correlated output, wherein each finger element is configured to multiply said correlated output by a corresponding channel weighting coefficient associated with said finger element; and a channel estimator for determining channel weighting coefficients for said finger elements, said channel estimator comprising:

a correlator configured to receive a pilot channel signal and to correlate said pilot channel signal with a pilot channel chip pattern to produce a pilot channel symbol sequence; and a channel estimation filter configured to receive said pilot channel symbol sequence and to generate channel weighting coefficients, wherein said channel estimation filter is configured to minimize a mean squared error in said channel weighting coefficients caused by at least one of: additive noise and Doppler effects, wherein said mean squared error is minimized across a range of Doppler frequencies from 0 Hz up to a specified maximum Doppler frequency;

wherein the channel estimation filter comprises a first filter, a second filter, and an adder, the adder configured to sum outputs of the first and second filters, and inputs of the second filter comprising outputs of the adder.

16. The RAKE receiver as set forth in claim 15 wherein said channel estimation filter is configured to minimize an average mean squared error over the entire Doppler range assuming that a mobile station velocity is uniformly distributed.

17. The RAKE receiver as set forth in claim 16 wherein said channel estimation filter is configured to minimize the average mean squared error over the entire Doppler range assuming a power spectral density of the received pilot channel signal follows a Jake's spectrum.

18. The RAKE receiver as set forth in claim 15 wherein said first filter comprises a 3-tap finite impulse response (FIR) filter and the second filter comprises a single pole infinite impulse response (IIR) filter.

19. The RAKE receiver as set forth in claim 18 wherein said single pole infinite impulse response (IIR) filter is a Butterworth filter having a maximally flat passband.

20. The RAKE receiver as set forth in claim 15 wherein one of the first and second filters in said channel estimation filter comprises a single pole infinite impulse response (IIR) filter which is a Butterworth filter having a maximally flat passband.

21. The RAKE receiver as set forth in claim 15 further comprising:
  a second correlator configured to receive a second pilot channel signal and to correlate said second pilot channel signal with a second pilot channel chip pattern to produce a second pilot channel symbol sequence; and
  a second channel estimation filter configured to receive said second pilot channel symbol sequence and to generate second channel weighting coefficients, wherein said second channel estimation filter is configured to minimize a second mean squared error of a second channel estimate in said second channel weighting coefficients caused by at least one of: the additive noise and the Doppler effects, wherein said second mean squared error is minimized across the range of Doppler frequencies.

22. The RAKE receiver as set forth in claim 21 wherein said channel estimation filter is configured to minimize a second average mean squared error over the entire Doppler range assuming that a mobile station velocity is uniformly distributed.

23. The RAKE receiver as set forth in claim 22 wherein said channel estimation filter is configured to minimize the second average mean squared error over the entire Doppler range assuming a power spectral density of the received second pilot channel signal follows a Jake's spectrum.

24. The RAKE receiver as set forth in claim 21 wherein said second channel estimation filter comprises a cascade of a 3-tap finite impulse response (FIR) filter and a single pole infinite impulse response (IIR) filter.

25. The RAKE receiver as set forth in claim 24 wherein said single pole infinite impulse response (IIR) filter is a Butterworth filter having a maximally flat passband.

26. The RAKE receiver as set forth in claim 21 wherein said second channel estimation filter comprises a single pole infinite impulse response (IIR) filter which is a Butterworth filter having a maximally flat passband.

27. A method for determining channel weighting coefficients for a finger of a RAKE receiver, the method comprising the steps of:
  receiving a pilot channel signal from a base station;
  correlating the pilot channel signal with a pilot channel chip pattern to produce a pilot channel symbol sequence; and
  generating from the pilot channel symbol sequence channel weighting coefficients and minimizing a mean squared error in the channel weighting coefficients caused by at least one of: additive noise and Doppler effects using a first filter, a second filter, and an adder, wherein the adder sums outputs of the first and second filters, wherein inputs of the second filter comprise outputs of the adder, and wherein the mean squared error is minimized across a range of Doppler frequencies from 0 Hz up to a specified maximum Doppler frequency.

28. The method as set forth in claim 27 wherein the step of minimizing minimizes an average mean squared error over the entire Doppler range assuming that a mobile station velocity is uniformly distributed.

29. The method as set forth in claim 28 wherein the step of minimizing minimizes the average mean squared error over the entire Doppler range assuming a power spectral density of the received pilot channel signal follows a Jake's spectrum.

* * * * *